United States Patent [19]

Pollinger et al.

[11] 4,050,553
[45] Sept. 27, 1977

[54] AUTOMATIC BRAKE RESETTING DEVICE

[75] Inventors: Hans Pollinger; Bernd Scheffel, both of Munich, Germany

[73] Assignee: Knorr-Bremse GmbH, Munich, Germany

[21] Appl. No.: 708,022

[22] Filed: July 23, 1976

[30] Foreign Application Priority Data

Dec. 5, 1975 Germany .............................. 2554806

[51] Int. Cl.² ............................................. F16D 65/66
[52] U.S. Cl. ............................... 188/203; 188/196 D; 192/111 A
[58] Field of Search ................... 188/202, 203, 196 D; 192/111 A

[56] References Cited

U.S. PATENT DOCUMENTS

| 3,100,032 | 8/1963 | Larsson | 188/203 X |
| 3,430,740 | 3/1969 | Larsson et al. | 188/202 |
| 3,878,924 | 4/1975 | Nadas | 188/203 |
| 3,899,053 | 8/1975 | Nadas | 188/203 |
| 3,970,173 | 7/1976 | Sander | 188/203 |

Primary Examiner—George E. A. Halvosa
Attorney, Agent, or Firm—Edmund M. Jaskiewicz

[57] ABSTRACT

In a brake cylinder there is a reciprocating piston from which extends a non-rotatable sleeve surrounding a co-axial non-rotatable axially displaceable threaded shaft upon which is threaded a coupling nut. A pair of rotary couplings are provided on opposed sides of the coupling nut with the sleeve and the rotary couplings are actuable by axial displacement of the coupling nut. A stop ring is axially displaceable on the coupling nut and is supported opposite to the braking direction by a fixed stop. A spring has one end acting against the stop ring and its other end acting against an abutment on the sleeve. A second stop on the coupling nut is spaced rearwardly of the first stop a distance approximately equal to the contact stroke of the vehicle brake when the resetting device is in the inoperative position.

7 Claims, 1 Drawing Figure

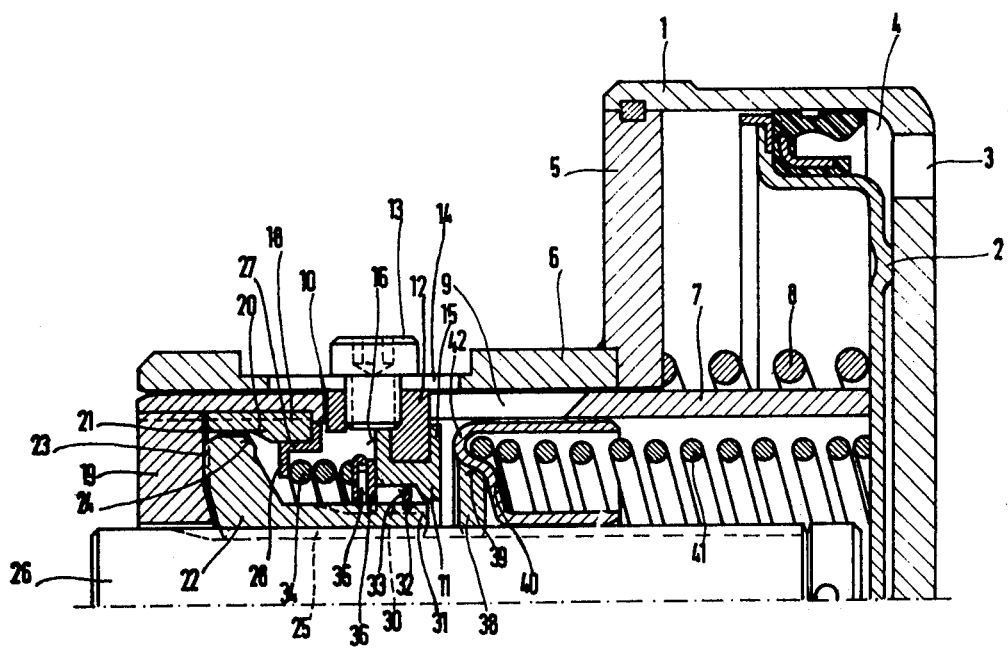

AUTOMATIC BRAKE RESETTING DEVICE

The present invention relates to an automatic brake resetting device, more particularly, to adjustment of the contact stroke of the brake on railway vehicles.

It is known to provide the brakes on railway vehicles with automatic brake linkage adjusting devices. One such device comprised an adjustable, axially displaceable non-rotatable shaft having reversible threads thereon. The shaft transmits braking force and is disposed co-axially within a non-rotatable sleeve connected to a source of braking force. A coupling nut is threaded on the shaft and two rotary clutches positioned on opposite sides of the coupling nut are actuated by axial displacement of the coupling nut with respect to the shaft. An axially displaceable stop ring is mounted upon the coupling nut and the stop ring is loaded by a spring acting contra the direction of the braking force. The stop rings abuts against a fixed stop which holds the stop ring from movement opposite to the braking direction. A flange on the coupling nut is spaced rearwardly of the fixed stop a distance approximately equal to the contact stroke of the vehicle brake. Such an adjusting device has a relatively simple structure requiring only a few components and occupies a small space. During the braking operation, the force of the brake motor acts only against a relatively weak spring.

The brake linkage adjusting device as described above which can also be made single acting for the operation of disc brakes includes a control sleeve which is displaced by the brake contact stroke to be capable of a limited range of displacement between two fixed stops. In addition, the distance between the stop ring and the coupling nut flange should correspond to the same contact stroke. Difficulties have been encountered in adjusting these two dimensional relationships to each other. In addition, the spring which loads the stop ring must absorb resiliently the entire brake stroke and as a result the brake stroke is limited by the spring. Since the spring acts upon the control sleeve and at the completion of the brake stroke acts upon one of the fixed stops, the adjusting of the position of the fixed stop in order to vary the magnitude of the brake contact stroke will produce a change which interferes with the maximum value of the brake stroke.

In another form of the brake linkage adjusting device as generally described above, the brake stroke can be absorbed by a second spring and can thus be increased. However, this use of a second spring is generally limited to this particular construction of the adjusting device and the inclusion of the second spring may give rise to significant structural difficulties.

It is therefore the principal object of the present invention to provide a novel and improved single acting automatic resetting device which is particularly adapted for the operation of disc brakes.

It is another object of the present invention to provide an automatic brake resetting device as described herein which is simple in construction, requires a minimum of components, occupies a relatively small volume when assembled on a vehicle, and whose total length is maintained at a minimum.

It is a further object of the present invention to provide such an automatic brake resetting device which transmits the entire force exerted by the brake motor.

It is an additional object of the present invention to provide such an automatic brake resetting device wherein the brake contact stroke can be established through a single dimension in an adjustment mechanism and the spring does not limit the distance of the brake stroke which may be of a relatively large magnitude.

According to one aspect of the present invention a brake resetting device may comprise a non-rotatable sleeve which is axially displaceable in the braking direction in response to a braking force and an axially displaceable non-rotatable threaded shaft is co-axially disposed within the sleeve. A coupling nut is threaded upon the shaft so as to be capable of rotary and axial movement thereon. The sleeve is provided with means disposed on both sides of the coupling nut to define a first rotary coupling with one side of the coupling nut and a second rotary coupling with the other side of the coupling nut. The rotary couplings are actuable by axial displacement of the coupling nut. A stop ring tranverses the coupling nut so as to be axially displaceable thereon and a fixed stop supports the stop ring contra the braking direction. A spring has one end acting upon the stop ring opposite to the braking direction of the sleeve and its other end acts upon abutment means on the sleeve in the braking direction. On the coupling nut there is a second stop spaced rearwardly of the first stop a distance which is approximately equal to the brake stroke when the brake resetting device is in the inoperative position.

As a result of this construction, the maximum compression of the spring will consist of the brake contact stroke increased by the coupling distance of the rotary couplings. Thus, the spring can be made relatively short in length together with the adjusting device. In addition, the length of the contact stroke is determined only by the position of a single stop. Since only a single dimension or parameter is thus involved in adjusting the contact stroke manufacturing tolerances are not critically important if the stop is adjustably positionable and the adjusting device is constructed with a relatively short stroke distance.

Other objects and advantages of the present invention will be apparent upon reference to the accompanying description when taken in conjunction with the following drawing, which is exemplary, wherein there is illustrated a longitudinal sectional view of a brake resetting device according to the present invention combined with a brake cylinder.

Proceeding next to the drawing, a specific embodiment and modifications will be described in detail.

A brake cylinder housing 1 has a brake piston 2 sealed therein for axial displacement. A line connection 3 in the cylinder housing 1 permits the introduction of a pressure medium into a cylinder chamber 4 which is located between the bottom of the cylinder housing 1 and the piston 2.

The front side of the brake cylinder housing 1 is closed off and sealed by a cover plate 5 from which extends a tubular projection 6 within which is displaceably positioned a sleeve 7 one end of which is attached to the piston 2. A linkage return spring 8 is positioned between the cover plate 5 and the piston 2.

In the portion of the sleeve 7 which is axially displaceable within the tubular projection there is formed a slot 9 at one end of which is a forward stop 10. Within the sleeve 7 there is an annular stop ring 11 mounted on an intermediate member 12 which extends into the slot 9. The stop ring 11 is mounted so as to be non-rotatable and non-displaceable within the tubular portion 6. Screws 13 secure the intermediate member 12 to the tubular portion 6 and each screw passses through a longitudinal slot 14 in the tubular projection 6 so that the intermediate member 12 with the stop ring 11 can be axially adjusted by loosening and tightening of the screws 13.

The radial face of the stop ring 11 facing toward the piston 2 forms a stop 15 and the radial face on the other side of the stop ring 11 forms in its radially forward portion a stop 16. Securely threaded into the forward end of the sleeve 7 are two coupling rings 18 and 19 which have coupling faces 20 and 21 respectively facing toward each other.

Positioned between the coupling rings 18 and 19 is a coupling nut 22 having a coupling surface 24 facing toward the coupling surface 20 of coupling ring 18 and a coupling surface 23 facing toward the coupling surface 21 of the coupling ring 19. The coupling surfaces 20 and 24 thus define a rotary clutch or coupling 20, 24 in the form of a cone friction clutch and the coupling sufaces 21 and 23 which extend radially are provided with axially extending teeth to form a rotary clutch 21, 23 between the coupling nut 22 and the sleeve 7.

The coupling nut 22 is threaded upon a reversible or non-self-locking thread 25 upon an adjusting spindle or shaft 26 whose end directed away from the brake piston 2 is pivotally connected in a known manner to a brake linkage which is not shown in the drawing. When the coupling nut 22 is rotated on the threaded shaft 26 so as to move to the right as viewed in the drawing which direction is opposite to the direction of the brake force, the brake linkage is extended which decreases the contact stroke when the vehicle brake is operated. The contact stroke is the distance through which the shaft 26 moves from its initial inoperative position to the position where contact is made between the braking surfaces.

Turning of the coupling nut 22 in the opposite direction so that the nut is displaced toward the right as viewed in the drawing increases the length of the contact stroke.

The end of coupling ring 18 facing toward the brake cylinder piston 2 is provided with a radial stop surface which is contacted by an annular shoulder portion of an abutment ring 27 having a stepped cross-section as may be seen in the drawing. The abutment ring 27 is provided with a radially inwardly extending flange portion 28. Thus, when the ring 27 is acted upon by a spring, as will be later described, in the braking direction the abutment ring will be supported against the sleeve 7 by the interaction of the shoulder on the ring 27 against the radial stop surface of the coupling ring 18.

The coupling ring 22 has a tubular extension 31 extending in the direction toward the brake piston 2 and the outer surface of the extension is provided with axially extending flat portions 30. The extension 31 projects into the zone of the stop ring 11. A flange ring 32 is fixed on the outer surface of the tubular extension 31 in the vicinity of the stop ring 11 to provide a second stop 33.

A spring 34 surrounds the extension 31 with a substantial clearance and one end of the spring 34 engages the annular portion 28 of abutment ring 27 and the other spring end connects through a thrust bearing 35 a stop ring 36 which is positioned against the stop 16 and is mounted on the extension 31 so as to be axially displaceable thereon. The central opening of the stop ring 36 is shaped to conform closely with the flat portion 30 on the extension 31 so that the ring 36 is capable of being displaced longitudinally but is non-rotatable with respect to coupling nut 22. The inner peripheral portion of the stop ring 36 extends radially inwardly of the ring 11 so as to contact the stop 33 on the flange 32. The distance between the stop ring 36 and flange 32 when the brake resetting device is in its inoperative position is approximately equal to the contact stroke of the friction brake. The stop ring 36 is non-rotatable at least in the direction of rotation of the coupling nut 22 which shortens the contact stroke. As a result, shocks and impacts upon the brake linkage will not cause accidental displacement of the adjusting device even when the brake is in the released position.

An adjusting nut 38 is threaded on the shaft 26 in the area between the stop ring 11 and the piston 2 so as to engage at 39 against a guide ring 40 which is mounted for axial displacement around the shaft 26 and within the sleeve 7. The stop 39 prevents rotation of the guide ring 40. A compression spring 41 is inserted between the piston 2 and the guide ring 40 to load the ring 40 in the braking direction against the adjusting nut 38. The guide ring 40 is maintained in a non-rotatable relationship with respect to the brake piston 2 by known structure which is not shown in the drawings, but which may comprise radially projecting bosses extending into a longitudinal groove formed in the sleeve 7 or solely by means of friction forces exerted by the compression spring 41. The guide ring 40 is provided with a bulging or projecting portion 42 positioned radially outwardly of the adjusting nut 38 so that the bulge extends axially slightly beyond the adjusting nut 38 and thus engages the stop 15 while permitting a small axial clearance between the adjusting nut 38 and the stops 15. The axial clearance assures that during the release operation of the brake, the brake linkage actuated by the adjusting device will remain in the brake contact position, but without any force, after the brake application force is reduced. The brake linkage is moved into the full release position only by applying force to the adjusting device. While this function will generally occur by itself in the brake linkage because of frictional forces therein the present invention provides a simple but effective structure which requires only a very short axial distance and virtually adds nothing to the overall length of the adjusting device.

In operation, the adjusting device as described above functions in the following manner:

In the inoperative condition with the brakes released, there is no pressure in the chamber 4 and the return spring 8 presses the piston 2 into its end position in a direction away from the cover plate 5. This end position may occur when the piston 2 engages the bottom of the cylinder as shown in the drawing or as determined by the contact of the end 10 of the slot 9 with the forward portion of the intermediate member 12. The piston 2 would then be positioned a short distance spaced from the bottom of the cylinder. The spring 34 exerts a force in one direction through the thrust bearing 35 and the annular element 36 against stop 16 on the fixed stop ring 11 and exerts a force in the other direction to urge the abutment ring 27 against the coupling ring 18 and, accordingly, against the sleeve 7. Since the return spring 8 is considerably stronger than the spring 34, the force exerted by the spring 34 is merely expended to the stop ring 11 and to the tubular portion 6. The rotary clutch 21, 23 is closed and the rotary clutch 20, 24 is open or disengaged. The stop 33 is positioned behind the stop ring 36 at a distance which corresponds to the contact stroke of the vehicle brake. The bulge 42 on the guide ring 40 is spaced from the stop 15 on stop ring 11 a distance corresponding to the stroke increased by a travel distance corresponding to the resilient brake linkage deformation or taking up of slack under maximum brake actuation conditions. The compression spring 41 exerts sufficient force against guide ring 40 through stop 39 against the adjusting nut 38 to prevent rotation of this adjusting nut. The coupling nut 22 which is secured against rotation has a force exerted thereon by the compression spring 41 through the adjusting nut 38 and the shaft 26 to increase the closing force of the rotary clutch 21, 23 on the front face of the coupling nut 22. The force exerted by the compression spring 41 is thus expended through coupling ring 19 and the sleeve 7.

As may be seen in the drawing, the adjusting spindle or shaft 26 is threaded to its maximum extent in the direction toward the brake cylinder housing 1. In practical operation, the shaft 26 will generally be in a position where it is threaded a short distance in the opposite direction. The brake linkage, which is not shown in the drawing, retains the shaft 26 so as to be non-rotatable about its longitudinal axis.

Unintentional rotation of the coupling nut 22 and consequently unintentional displacement of the coupling nut cannot occur should the shaft 26 be subjected to longitudinal forces from the brake linkage such as might be produced by shocks and impacts acting on the vehicle and because of the inertia of the linkage. Such forces which are directed toward the left as viewed in the drawing are transmitted to the sleeve 7 while increasing the coupling forces of the coupling 21, 23 and the coupling nut 22 will thus be held securely against rotation. Should such forces occur directed toward the right as viewed in the drawing, the coupling nut 22 may become seperated from coupling ring 19 against the force of the spring 41 but will be maintained against rotation by the interaction of the flat portions 30 and the stop ring 36 which will be pressed by the spring 34 against fixed stop 16 and thus cannot turn because of a frictional coupling. Accordingly, the coupling nut 22 cannot be rotated on the shaft 26. After this force diminishes, the spring 41 will again press the coupling nut 22 against coupling ring 19.

In order to actuate the brake, a pressure medium as known in the art is introduced into the cylinder chamber 4 and the brake piston 2 is correspondingly displaced against the force of return spring 8 in the braking direction toward the cover plate 5. The sleeve 7 with its coupling rings 18 and 19 is also displaced in the braking direction together with the coupling nut 22 and shaft 26 under the force exerted by spring 41. The spring 41 acts on the shaft 26 through guide ring 40, stop 39, and adjustment nut 38 which will be retained against rotation. The rotary coupling 21, 23 will remain engaged. The tension of spring 34 will be somewhat decreased during this operation and the spring 34 will still maintain the stop ring 36 in contact with stop 16.

If the brake application stroke has been properly set, the brake will become engaged just when the shaft 26 has advanced to such an extent that stop 33 of the flange ring 32 just engages the stop ring 36. During further application of the braking stroke, the brake cylinder piston 2 together with sleeve 7 will be displaced further in the braking direction but the coupling nut 22 will not be able to accompany this displacement because of the contact between flange 32 and the stop ring 36. As a result, the rotary coupling 21, 23 will become disengaged and the rotary coupling 20, 24 will be immediately engaged. During this change of states of the couplings the coupling nut 22 will be secured against rotation by the stop ring 36.

Should the application stroke of the brake linkage be too short such as might occur when the brake lining has just been replaced, the brake will become engaged when there is still a predetermined distance existing between the stop 33 and the stop ring 36. Upon further advance of the brake cylinder piston 2 in the braking dirction together with the sleeve 7 and the coupling rings 18 and 19, the spring 41 will no longer be able to carry along the shaft 26. The shaft 26 will now remain stationary because of the force acting in the opposite direction and exerted by the applied brake through the brake linkage. The coupling ring 19 is thus seperated somewhat from the coupling nut 22 so that the rotary coupling 21, 23 is disengaged and the rotary coupling 20, 24 is now engaged. The stop ring 36 will maintain the coupling nut 22 against rotation in this situation so that unintentional turning of the coupling nut on the shaft thread 25 will not occur during the switching of the coupling conditions of the rotary couplings.

During subsequent stages of this braking operation, the brake piston 2 will be further moved in the braking direction together with the sleeve 7, but the coupling nut 22 will be prevented from rotation by engagement of the rotary coupling 20, 24, The shaft 26 which is retained against rotation by its connection with the brake linkage is also displaced and in connection with the resilient deformation of the brake linkage will exert a powerful application or operation of the brake. The stop 32 will carry along the stop ring 36 which will become separated from stop 16. The spring 34 will retain its tension since the abutment ring 27 will similarly follow the displacement of sleeve 7. As a result, the full application of the braking stroke is not limited in any way by the spring 34.

When the brake cylinder 2 is subjected to the maximum pressure and the brake is thus actuated to its highest degree or full application, the projecting portion 42 on the guide ring 40 should just engage the pressure stop 15 on the stop ring 11. If this engagement has already occurred, the guide ring 40 will be held back by the stop ring 11 with respect to the sleeve 7, the adjusting nut 38 will abut the stop 15 and will be threaded along the shaft 26 during the remainder of the braking stroke (as described above) up the the maximum force exertion on the brake. The nut 38 rotating on the shaft 26 will be displaced in the direction toward the piston 2. The stop 39 is thus released slightly by the magnitude of the axial projection of the bulge 42 beyond the adjusting nut 38 in the braking direction.

In order to release the brake, the pressure within the cylinder chamber 4 is reduced. During this diminishing of the braking force previously exerted by the pressure medium, the brake linkage will absorb any play therein and will thus displace the shaft 26 in the direction toward the brake cylinder housing 1. By means of the coupling nut 22 and the engaged rotary coupling 20, 24 and also the coupling ring 18, the sleeve 7 will be carried in this release direction along with the brake piston 2. The tension in the return spring 8 will thus be partially reduced while the compression spring 41 is compressed by the adjusting nut 38 which is retained against rotation by the abutment of the stop 39 on guide ring 40 and the nut 38 will thus be carried along with the shaft 26. As soon as the stop ring 36 which is moving back together with the coupling nut 22 contacts stop 16, the braking force and thus any play in the brake linkage are eliminated and the brake will than abut without any force, if the releast stroke of the brake has been properly set.

During further reduction of pressure in the chamber 4, only the return spring 8 will press the piston 2 and the sleeve 7 back into the release or inoperative position. The brake linkage will no longer exert any force on the adjusting shaft 26 but this shaft will be loaded opposite to the release direction by the compression spring 41 acting through the guide ring 40, stop 39 and adjusting nut 38. The rotary coupling 20, 24 will be disengaged during this release movement of the sleeve 7 while the coupling nut 22 will remain stationary for a relatively short time and the rotary coupling 21, 23 will be engaged immediately thereafter. The coupling nut 22 is now retained against rotation by the engaged rotary clutch 21, 23 by the force of spring 41 and will be urged back because of the force of the return spring 8 exerted through sleeves 7 and coupling ring 19 to thus carry back the shaft 26 through threads 25.

This return movement of the shaft 26 will produce on one hand through the brake linkage a release of the brake by the amount of the release clearance thereof whereby the brake will come back into its completely released condition and, on the other hand will achieve a further compression of the spring 41 through the action of the adjusting nut 38 and the guide ring 40. During this return movement, the flange 32 will be separated from the stop ring 16. When the piston 2 contacts the bottom of the cylinder, the completely released condition of the device is again attained as shown in the drawing.

If, because of previous wear of the brake shoe, the release stroke has been set too long, then the brake linkage will already be unstressed before the stop ring 36 contacts stop 16 during the return movement associated with the release of the brake. Since no further force is exerted by the brake linkage on the spindle shaft 26, the shaft 26 will then remain stationary under the force of the compression spring 41 acting in the opposite direction during further return movement of the piston 2 and sleeve 7 together with the coupling rings 18 and 19. The rotary coupling 20, 24 will then become slightly disengaged. Immediately upon the release of rotary coupling 20, 24, the coupling nut 22 will begin to thread itself back upon the shaft 26 which is stationary because of the force exerted by the spring 34 upon the coupling nut 22 through thrust bearing 35, stop ring 36 and stop 33 and supported on the other side by the sleeve 7 through abutment ring 27. Thus, the coupling nut 22 will be threaded back on the adjusting shaft 26 to correspond to the return travel of the brake cylinder piston 2 and sleeve 7 until stop ring 36 abuts stop 16. The spring 34 will then be arrested against stop ring 11 and is no longer able to exert any return force on the coupling nut 22. The adjusting operation is now completed.

During any further return travel of the piston 2 and sleeve 7 under the force exerted by the return spring 8, the coupling nut 22 will remain stationary for a short duration of time and the rotary coupling 20, 24 will be released and the rotary coupling 21, 23 will be engaged. The stop ring 36 which contacts the stop 16 so as to be non-rotatable thereagainst will retain the coupling nut 22 against rotation. Subsequent operation will occur as described above.

In a modification of the invention as described above, the compression spring 41 may be omitted together with the guide ring 40, the adjusting nut 38 and the stop 39 if it is made certain that the brake linkage will remain stationary after its tensioning forces have been removed during the release procedure under its own frictional resistance or under a suitably installed movement brake.

In a further modification, the abutment ring 27 may be omitted and the spring 34 positioned to act directly against the coupling ring 18 or a portion thereof.

According to the present invention, the contact stroke of the brake, or the distance the brake must travel before contact is made between the braking surfaces, can be very easily and precisely adjusted over a wide range by axially positioning the intermediate member 12 and thus adjusting the position of the stop 16 by means of the screws 13 that are located in the longitudinal slots 14. The slots 14 are unloosened, the intermediate member 12 axially positioned to vary the stroke distance as may be desired and the screws then tightened to secure the intermediate member and the stop 16 in their newly adjusted positions. Thus, only a single dimension or parameter need be adjusted.

It will be understood that this invention is susceptible to modification in order to adapt it to different usages and conditions, and accordingly, it is desired to comprehend such modifications within this invention as may fall within the scope of appended claims.

What is claimed is:

1. In an automatic brake resetting device particularly for brakes of railway vehicles the combination of a non-rotatable sleeve axially displaceable in the braking direction in response to a braking force and having abutment means thereon, an axially displaceable non-rotatable threaded shaft co-axially disposed within said sleeve, a coupling nut threaded upon said shaft and capable of rotary and axial movement thereon, means on said sleeve for defining a first rotary coupling with one side of said coupling nut and a second rotary coupling with the other side of said coupling nut, said rotary couplings being actuable by axial displacement of said coupling nut, a stop ring traversing said coupling nut and axially displaceable thereon, a fixed first stop to support said stop ring opposite to the braking direction, a second stop on said coupling nut spaced in the direction opposite to said braking direction relative to said first stop a distance approximately equal to the contact stroke of the vehicle brake when the brake resetting device is in the inoperative position, and spring means between said abutment means and said stop ring to act continuously upon said sleeve in the braking direction and to act on said stop ring opposite to the braking direction.

2. In an automatic brake resetting device as claimed in claim 1 wherein one end of said spring means acts upon said sleeve and the other end of said spring means acts upon said stop ring.

3. In an automatic brake resetting device as claimed in claim 2 wherein said abutment means comprises a ring supported in the braking direction by said sleeve.

4. In an automatic brake resetting device as claimed in claim 3 wherein said ring has a stepped cross-section defining outer and inner radial flanges and said outer flange acts upon said sleeve and said inner flange is acted upon by said spring means.

5. In an automatic brake resetting device as claimed in claim 1 wherein said coupling nut has an extension, said stop ring non-rotatably mounted on said extension at least in the direction of rotation of said coupling nut to shorten the contact stroke.

6. In an automatic brake resetting device as claimed in claim 5 wherein said extension has on its outer surface an axially extending flat portion, said stop ring having its opening conforming to said flat portion.

7. In an automatic brake resetting device as claimed in claim 1 and further comprising a non-rotatable guide ring mounted for axial displacement upon said threaded shaft, a compression spring having one end acting upon said sleeve opposite to the braking direction and the other end acting against said guide ring, a third stop limiting the displacement of said guide ring in the braking direction, an adjusting nut on said shaft axially between said third stop and said guide ring and engageable with said guide ring, there being axial clearance between said third stop and said adjusting nut when said guide ring contacts said third stop.

* * * * *